United States Patent [19]

Bartolucci

[11] 3,974,916

[45] Aug. 17, 1976

[54] VISUAL INDICATOR FOR IDENTIFYING CONTAINER CONTENTS

[76] Inventor: Edgar O. Bartolucci, Ridge Road, Tuxedo Park, N.Y. 10987

[22] Filed: May 27, 1975

[21] Appl. No.: 580,590

[52] U.S. Cl. .................................. 206/459; 229/43; 229/1.5 B; 116/130

[51] Int. Cl.[2] .................. B65D 43/00; B65D 73/00; G01D 13/00

[58] Field of Search .................. 229/43, 1.5 B, 7 R, 229/7 S; 206/459; 220/90.2, 265, 266; 116/130, 114 AC

[56] References Cited

UNITED STATES PATENTS 2,685,860 8/1954 Plakas .............................. 229/1.5 B 2,723,643 11/1955 Weiss .......................... 229/1.5 B X

*Primary Examiner*—William Price
*Assistant Examiner*—Steven M. Pollard
*Attorney, Agent, or Firm*—Samuelson & Jacob

[57] ABSTRACT

A cup cover carries a plurality of raised, dome-shaped portions, each of which is capable of manual eversion, and visible indicia associated with each raised portion and identifying a variety of contents which can be placed in the cup. Manual eversion of a selected raised portion alters the appearance of that portion to provide a visual indication of the identity of the particular contents contained in the cup.

16 Claims, 4 Drawing Figures

VISUAL INDICATOR FOR IDENTIFYING CONTAINER CONTENTS

The present invention relates generally to containers and pertains, more specifically, to a visual indicator for identifying the contents of a container which can contain any one of a variety of contents.

The current increase in the popularity of carry-out food operations has given rise to the need for food containers which are reliable, easy to use and economical. One perenial problem has been the need to mark a container with appropriate information to identify which one of a variety of possible contents has been placed in the container, and to do so with maximum speed, minimum effort and no error.

For example, a harried counterman dispensing cupful after cupful of coffee "to go" must mark each cup to indicate whether the coffee is "regular", black, with sugar or with cream. Usually, marking is done with a writing instrument. Some cup covers have been provided with a series of printed or embossed indicia, one of which can be circled to choose the appropriate identification of the contents. In either case, marking is generally a two-hand operation requiring the presence of a marking instrument.

It is an object of the present invention to provide a container with a selective indicator which visually indicates the identity of the one of a variety of possible contents in the container without requiring a separate writing or marking instrument, or any other implement, to effect the appropriate indication.

Another object of the invention is to provide a visual indicator of the type described which is exceptionally easy to use and can be operated with one hand.

Still another object of the invention is to provide a visual indicator of the type described which will not affect the integrity of the container.

A further object of the invention is to provide a visual indicator of the type described which enables foolproof identification of the container contents with an easily understood, readily viewed indication.

A still further object of the invention is to provide a visual indicator of the type described which is easily fabricated, using current techniques and materials, and is fully compatible with current containers so as to be economical in both manufacture and use.

The above objects, as well as still further objects and advantages, are attained by the invention which may be described briefly as providing, in a container capable of carrying a particular one of a variety of contents, a selective indicator for visually indicating the identity of the particular contents, the indicator comprising at least one raised portion in a visible surface of the container, the raised portion being capable of selective manual permanent deformation to alter the appearance of the portion, and visible indicia associated with the raised portion, the indicia being related to one of the variety of contents.

The invention will be more fully understood, while further objects and advantages thereof will become apparent, by reference to the following detailed description of an embodiment of the invention illustrated in the accompanying drawing, in which.

Figure 1:
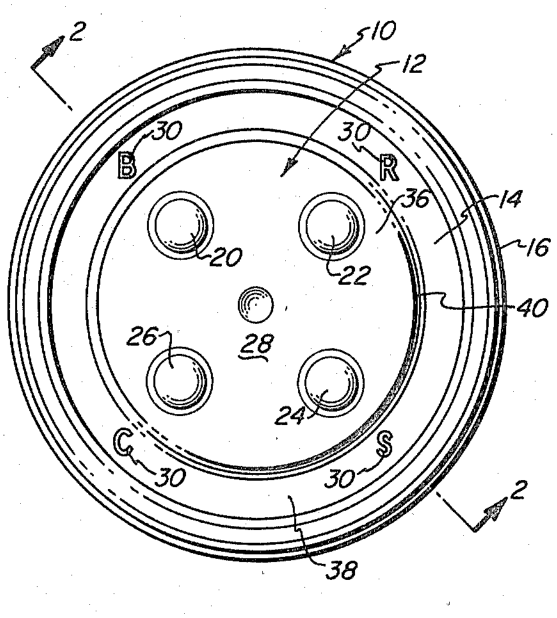
FIG. 1 is a top plan view of a cup cover incorporating an indicator constructed in accordance with the invention.
Figure 2:
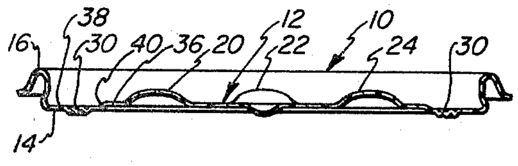
FIG. 2 is a cross-sectional view taken along line 2—2 of FIG. 1.

Referring now to the drawing, and especially to FIGS. 1 and 2 thereof, a cup cover 10 is provided with an indicator 12 constructed in accordance with the invention. Cover 10 has a thin-walled construction which includes a central web 14 surrounded by a peripheral channel 16, in much the same arrangement as conventional cup covers presently available commercially. Preferably, cover 10 is constructed of a semi-rigid thermoplastic synthetic resin and is fabricated by vacuum forming.

Indicator 12 includes a plurality of raised portions, in this instance four raised portions 20, 22, 24 and 26, having a generally domed configuration and extending upwardly from the top surface 28 of the cover 10. Each raised portion has associated therewith indicia in the form of a letter 30 placed on the visible surface 28 of the cover. Letters 30 may be printed or otherwise permanently available on surface 28. In this instance, letters 30 are debossed as a part of the forming operation by which cover 10 is fabricated.

Figure 3:
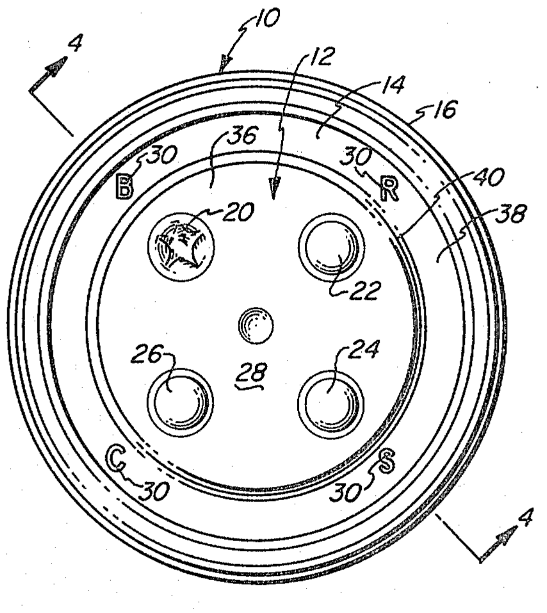
FIG. 3 is a top plan view of the cup cover of FIG. 1 in place on a cup with the indicator identifying the contents of the cup.
Figure 4:
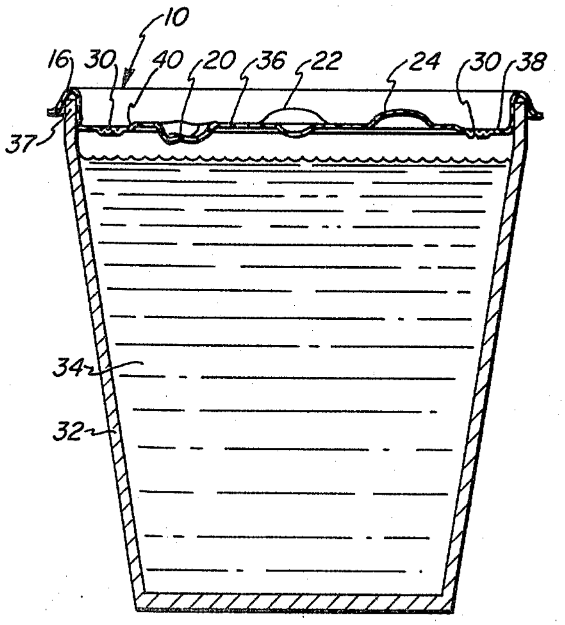
FIG. 4 is a cross-sectional view taken along line 4—4 of FIG. 3.

Turning now to FIGS. 3 and 4, cover 10 is shown placed upon a cup 32, the cup 32 and cover 10 thereby forming a container, containing contents in the form of coffee 34. Lip 37 of the cup 32 enters channel 16 of the cover to seal the container in a now conventional manner. The coffee in the cup may be "regular", black, with cream or with sugar. The indicator 12 includes indicia for identifying each one of the above possibilities; namely, the letter R for regular, the letter B for black, the letter C for cream and the letter S for sugar, each letter being associated with one of the raised portions 20, 22, 24 and 26 by virtue of the proximity of the letter and a corresponding raised portion. In this instance coffee 34 is black; hence, raised portion 20 has been manually depressed to permanently deform the portion downwardly through eversion of the raised portion. The everted portion 20 is readily visible as an indication of the identity of the contents of cup 32.

It is noted that eversion of the portion 20 is readily accomplished manually without requiring any special instrument or implement — all that is required is ordinary finger pressure on the appropriate raised portion. The everted portion 20 does not become ruptured; hence, the integrity of the sealed container remains intact. The semi-rigid nature of the cover material assures that the deformed portion 20 will remain deformed as an indication of the particular contents in the container.

In order to assure that manual pressure on any one of the raised portions 20, 22, 24 and 26 is localized and will not result in damage to the cover 10 or even mutilation of letters 30, means is provided for isolating the raised portions from the corresponding letters 30. Thus, raised portions 20, 22, 24 and 26 are located in a platform 36 which is isolated from the indicia-carrying annular area 38 of the cover by means of a circular shoulder 40 placed between the platform 36 and the area 38. The shoulder 40 serves to reinforce the cover and limit deformation due to manual pressure upon any of the raised portions to eversion of the selected raised portion. In addition, the platform 36 is spaced upwardly from area 38 so as to provide clearance beneath the platform, between the coffee 34 and the cover 10, so that eversion of a raised portion will not cause displacement of the coffee which could result in undue pressure exerted by the coffee on the cover.

Indicator 12 thus provides a relatively economical visual indication of the identity of the contents of cup 32 without a radical departure from the construction of currently available cup covers. Cup cover 10 can be fabricated of currently available materials, utilizing those manufacturing techniques which are now used for cup covers. The visible indication provided by indicator 12 is positive, easy to view, does not require a special instrument or implement and does not affect the integrity of the cover.

It is to be understood that the above detailed description of an embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. In a container capable of carrying a particular one of a variety of contents, a selective indicator for visually indicating the identity of the particular contents, said indicator comprising:

at least one raised portion in a visible surface of the container, said raised portion being capable of selective manual permanent deformation to alter the appearance of the portion; and visible indicia associated with said raised portion, said indicia being related to one of the variety of contents.

2. The invention of claim 1 wherein the raised portion has a generally domed configuration and the deformation comprises eversion of the domed configuration.

3. The invention of claim 2 wherein the raised portion is in a relatively thin-walled section of the container to facilitate manual eversion without rupture of the portion.

4. The invention of claim 3 wherein the indicia is located on an area of the container adjacent the raised portion so as to preclude mutilation of the indicia upon eversion of the raised portion.

5. The invention of claim 4 including means in the structure of the container for isolating the raised portion from the corresponding indicia to further assure that the indicia is not mutilated in response to eversion of the raised portion.

6. The invention of claim 5 wherein said isolating means includes:

a platform spaced from the indicia-bearing area of the container, said raised portion being located on the platform; and a reinforcing shoulder connecting the platform with the indicia-bearing area.

7. The invention of claim 6 wherein the platform is spaced from the indicia-bearing area in the direction in which the raised portion is raised.

8. In a cover for a container capable of carrying a particular one of a variety of contents, a selective indicator for visually indicating the identity of the particular contents, said indicator comprising:

at least one raised portion in a visible surface of the cover, said raised portion being capable of selective manual permanent deformation to alter the appearance of the portion; and visible indicia associated with said raised portion, said indicia being related to one of the variety of contents.

9. The invention of claim 8 wherein the raised portion has a generally domed configuration and the deformation comprises eversion of the domed configuration.

10. The invention of claim 9 wherein the raised portion is in a relatively thin-walled section of the cover to facilitate manual eversion without rupture of the portion.

11. The invention of claim 10 wherein the indicia is located on an area of the cover adjacent the raised portion so as to preclude mutilation of the indicia upon eversion of the raised portion.

12. The invention of claim 11 including means in the structure of the cover for isolating the raised portion from the corresponding indicia to further assure that the indicia is not mutilated in response to eversion of the raised portion.

13. The invention of claim 12 wherein said isolating means includes:

a platform spaced from the indicia-bearing area of the cover, said raised portion being located on the platform; and a reinforcing shoulder connecting the platform with the indicia-bearing area.

14. The invention of claim 13 wherein the platform is spaced from the indicia-bearing area in the direction in which the raised portion is raised.

15. In a cover for a container capable of carrying a particular one of a variety of contents, said cover having a relatively thin-walled, semi-rigid construction, such as a vacuum-formed synthetic resin construction, a selective indicator for visually indicating the identity of the particular contents, said indicator comprising:

a plurality of raised portions in a visible surface of the cover, each raised portion being capable of selective manual permanent deformation to alter the appearance of the portion; and visible indicia associated with each raised portion, each said indicia being related to one of the variety of contents.

16. The invention of claim 15 wherein each raised portion has a generally domed configuration and the deformation comprises eversion of the domed configuration.

* * * * *